United States Patent
O'Connor et al.

[11] 3,908,471
[45] Sept. 30, 1975

[54] FLUIDIC JET POSITIONER

[75] Inventors: Ward F. O'Connor, Deanville; Ernest A. Crawford, Ridge Wood, both of N.J.

[73] Assignee: The Lummus Company, Bloomfield, N.J.

[22] Filed: May 7, 1971

[21] Appl. No.: 141,156

[52] U.S. Cl. .......................... 74/18.1; 137/83; 91/3
[51] Int. Cl.² .......................... F15B 5/00; F16J 3/04
[58] Field of Search ........ 137/83; 91/3; 74/18, 18.1, 74/519

[56] References Cited
UNITED STATES PATENTS
2,779,197  1/1957  Embree ............................. 74/18.1
3,282,283  11/1966  Takeda ................................. 91/3
3,433,133  3/1969  Brewer ................................. 137/83

*Primary Examiner*—Alan Cohan
*Attorney, Agent, or Firm*—Marn & Jangarathis

[57] ABSTRACT

A frictionless fluid-mechanical transducer system for establishing and maintaining the position of a fluid jet nozzle within a pressure chamber. A very small force, applied to a lever external to the pressure chamber, is transmitted through a novel, frictionless linkage system to position a jet nozzle between a pair of fluid outlets thereby proportioning the flow of a pressurized fluid from the jet nozzle between the outlets.

1 Claim, 8 Drawing Figures

Fig. 1.

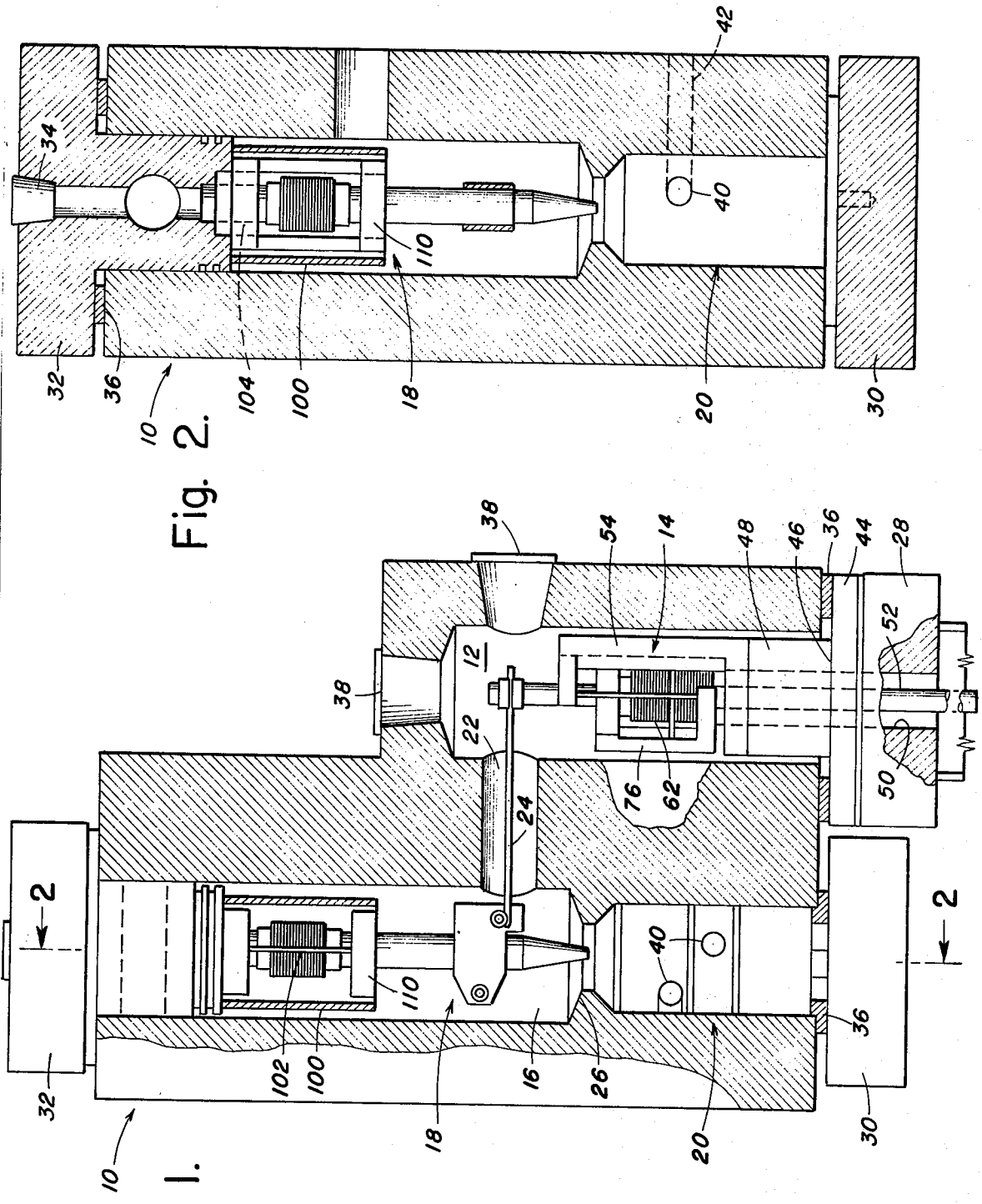

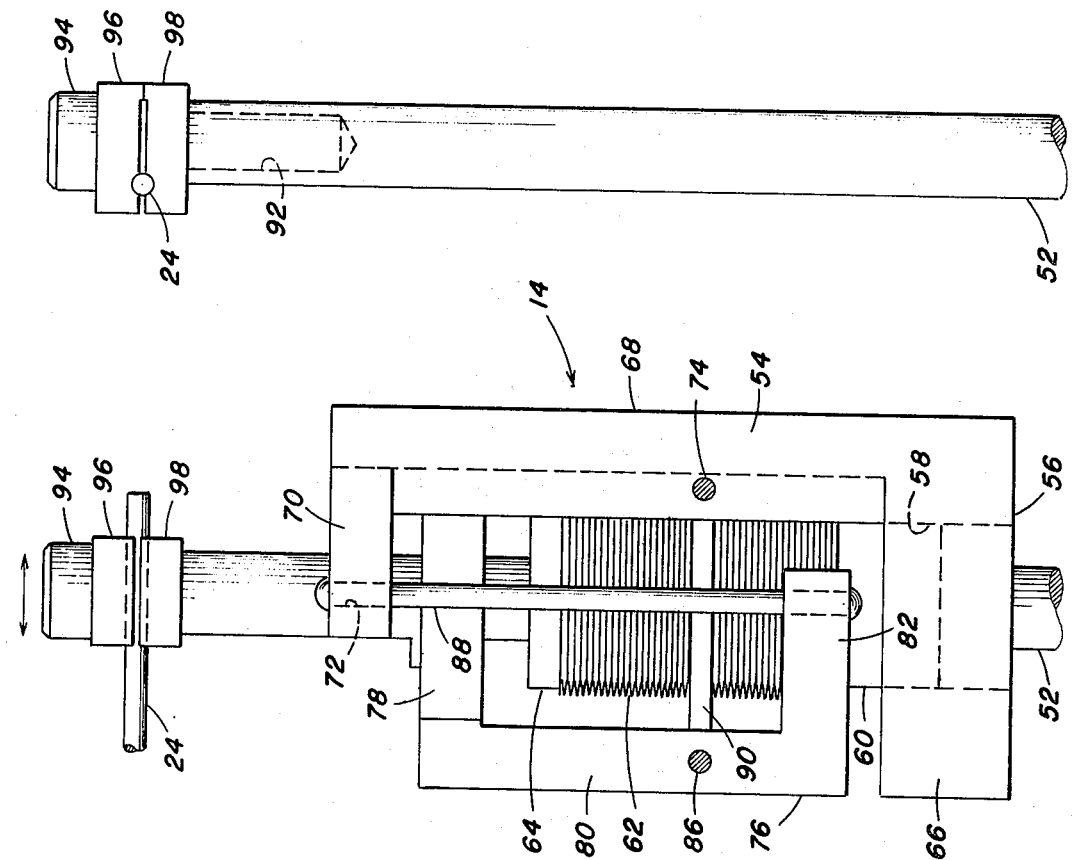
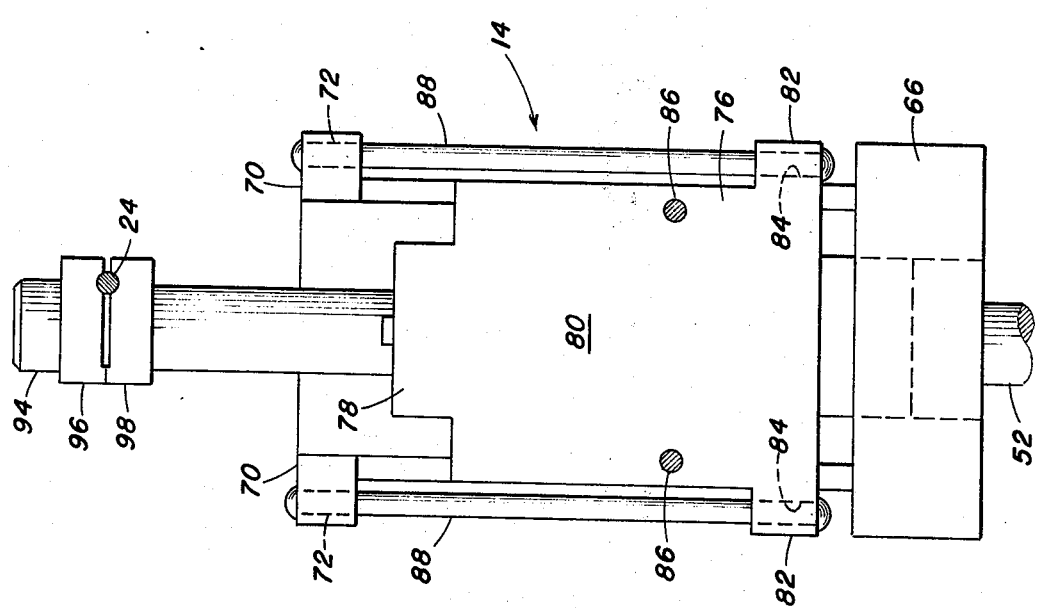

INVENTORS
Ernest A. Crawford
Ward F. O'Connor

BY *Marn & Jangarathis*

ATTORNEYS

FLUIDIC JET POSITIONER

BACKGROUND OF THE INVENTION

This invention relates generally to fluidic control and, more particularly, it relates to a control technique wherein an input or feedback signal is translated into mechanical motion, and this motion is used to position a nozzle of a fluid jet between a pair of fluid outlets thereby proportioning the fluid issuing from the nozzle between the outlets. In a typical application, an electrical or acoustic signal is translated into mechanical motion by a voice coil. The voice coil is linked by the apparatus of the present invention to the nozzle in a fluid-mechanical transducer, which proportions the flow of fluid between a pair of orifices in a fluid distributor block. The two fluid streams from the outlets in the distributor block are used to modulate, for instance, a pair of vented vortex amplifiers, the outputs of which control the position of a piston in a fluid operated valve controller. Of course, many other applications are possible, and the invention is not limited by the foregoing in any way. The control function may be exercised directly rather than through fluid amplifiers. The fluid may be steam, gas, or a liquid. The function controlled may be the speed or power output of a turbine or hydraulic motor, the position of a single or double-acting cylinder or diaphragm, draft control, web guide, hydraulic elevator, flow or pressure-regulating valve, roll positioner, constant tension drive, etc.

Mechanical systems for positioning jets within pressure chambers have been used heretofore. Generally, such systems have proven unsatisfactory, because they either failed to carry out the desired control function with sufficient accuracy, or they required a greater mechanical input force than was readily available. More particularly, many such systems employ bearings or shaft seals for the movable part transmitting the mechanical force through the wall of the enclosure to the nozzle. Such bearings or seals inherently create friction, and either increase the required force, decrease the accuracy of the system, or both. Some systems are affected by the pressure existing within the chamber, resulting in unbalanced forces, thus imparting a consistent error to the output streams. Lastly, some systems inherently require a relatively high operating force, even though they do not have the other noted problems. Typical in the latter category are those systems employing torsion tubes.

OBJECTS OF THE INVENTION

It is an object of the present invention to provide an essentially friction-free fluid-mechanical transducer.

Another object of the present invention is to provide a fluid-mechanical transducer operative on a small applied force.

A further object of the present invention is to provide a fluid-mechanical transducer which is unaffected by the pressure within the system, or by changes thereof.

Still another object of the present invention is to provide a fluid-mechanical transducer containing no packings, bearings or other sources of mechanical friction.

A still further object of the present invention is to provide a fluid-mechanical transducer which, in combination with a sensing device and suitable control means, provides an accurate and very rapid response.

Various other objects and advantages of the invention will become clear from the following detailed description of a preferred embodiment thereof, and the novel features will be particularly pointed out in connection with the appended claims.

BRIEF DESCRIPTION OF DRAWINGS

Reference will be made hereinbelow to the accompanying drawings, wherein:

FIG. 1 is a cross-sectional elevation of a preferred embodiment of the invention;

FIG. 2 is a cross-sectional elevation taken along line II—II of FIG. 1;

FIG. 3 and FIG. 4 are side and top views, respectively, of the lever mounting assembly of the FIG. 1 embodiment;

FIG. 5 is a detailed view of the connection between the lever and the nozzle link of the FIG. 1 embodiment;

DESCRIPTION OF PREFERRED EMBODIMENT

Figure 8:
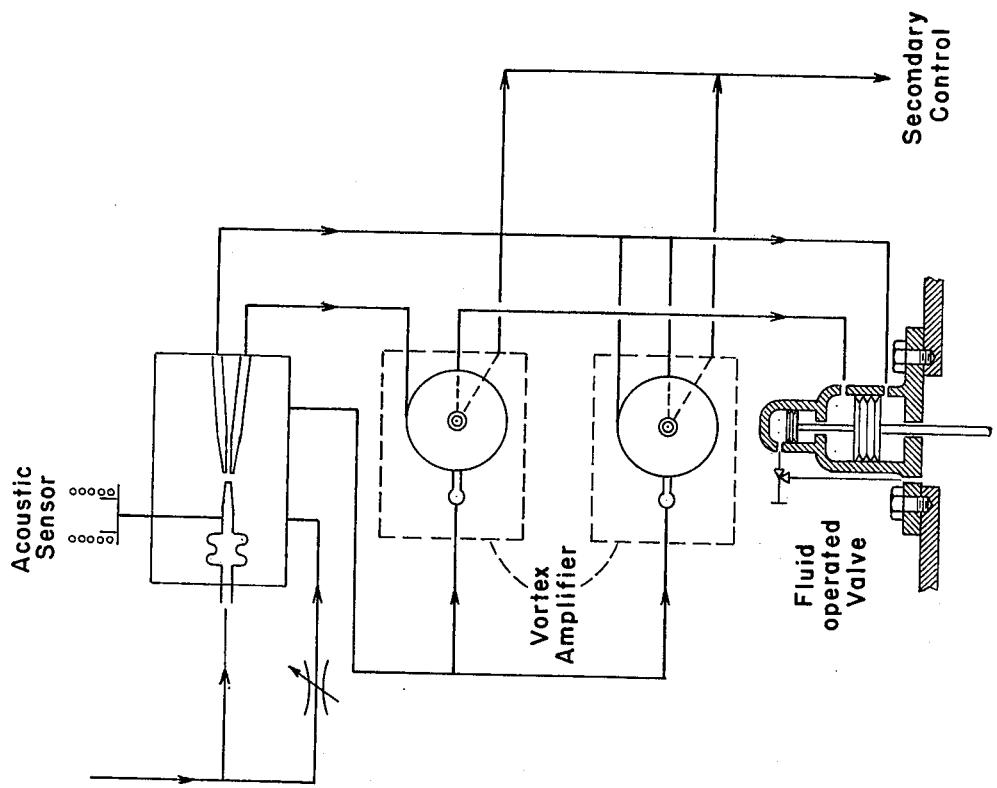
FIG. 8 is a schematic diagram of a control system employing the invention with integral fluid amplifiers.

Broadly speaking, the objects of the invention are carried out by providing a lever arm extending through the wall of a pressure chamber and sealed thereto with a bellows structure. The lever is held in a fixed position and is allowed freedom of movement in a single plane only about an imaginary fulcrum by a tension flexure and a transverse flexure, one fixed and one movable. A nozzle link connects the inside end of the lever arm with the nozzle assembly. The nozzle assembly comprises an upstream tube in fluid communication with the fluid inlet and a second bellows structure, a downstream tube also connected to the bellows and having an annular collar cooperating with a sleeve to restrict its movement, and the nozzle linked to the lever arm. Fluid passing through the nozzle flows into a distributor block assembly comprising a disc and a plug having a pair of orifices communicating with fluid outlets. A pair of integral fluid amplifiers may optionally be constructed in direct communication with the fluid outlets.

Referring now to the drawings, and particularly to FIG. 1 and FIG. 2, a pressure chamber is located within a block 10 of suitable material, such as steel, and is comprised of a first cylindrical chamber 12 for retaining the lever arm assembly, indicated generally at 14; a second cylindrical chamber 16 parallel to chamber 12 but extending entirely through block 10 and housing in its upper portion the nozzle assembly 18 and in its lower portion distributor block assembly 20; and a connecting chamber 22 allowing for passage of the nozzle link 24 from chamber 12 to chamber 16. The upper and lower portions of chamber 16 are defined by an intermediate tapered annular shoulder 26. It is in the restricted area defined by shoulder 26 that the tip of nozzle assembly 18 and the orifices in distributor block assembly 20 meet in close proximity. The lower end of lever arm assembly chamber 12 is closed by a lever flange 28. The lower end of chamber 16 is closed with the distributor block back plate 30. The upper end of chamber 16 is closed with the nozzle plug 32 containing the fluid inlet passage 34. A pressure-tight condition within chambers 12, 16, 22 is assured by use of suitable O-ring or static seals 36 on elements 28, 30 and 32, and pressure-tight plugs 38 are provided in other openings required for construction or access purposes. A pair of ports 40 in distributor block assembly 20 communicate with passages 42 in block 10 leading to the fluid outlets.

Lever arm assembly 14 will now be described in detail, and attention is directed to FIGS. 1, 3, 4 and 5. Lever flange 28 is bolted to block 10 and retains therebetween the outwardly extending collar portion 44 of the lever companion flange 46. A cylindrical boss 48 extends from collar portion 44 into chamber 12. Both lever flange 28 and lever companion flange 46 have a centrally located co-axial passage 50 through which the lever arm 52 passes. At its external end, lever arm 52 includes a suitable fitting for connection to the signal sensing means (not shown).

The means for retaining lever arm 52 in a fixed position while allowing movement thereof in a single plane about an imaginary fulcrum are welded to the upper surface of boss 48 of lever companion flange 46, and are best seen in FIGS. 3 and 4. The fixed bracket 54 has a surface 56 of the same general configuration as the top of boss 48 (including a central opening 58 for lever arm passage 50) with surface 56 being welded thereto.

The end section of a hollow tube 60 is force fitted into passage 58. Its free end supports one end of the bellows 62, the other end of which is fitted to the annular collar 64 on lever arm 52. Since passages 50 and 58 are large compared to lever arm 52, bellows 62 support lever arm 52, but its movement is not impeded thereby. Returning to the structure of fixed bracket 54, it is comprised of a base portion 66 including surface 56 and passage 58, an extending support portion 68 parallel to but spaced from bellows 62 and arm 52, and a pair of arms 70 integral with the distal end of support 68. Support portion 68 has the general configuration of a segment of a cylinder. The arms 70 contain a small aperture 72 for mounting of suspension wires. Another pair of suspension wire apertures 74 are located about midway along the length of support portion 68 as discussed hereinbelow.

The movable bracket 76 is of the same general configuration as fixed bracket 54 but is smaller in size. The base portion 78 of movable bracket 76 is actually a collar secured around lever arm 52 adjacent the bellows-securing collar 64. The support portion 80 of movable bracket 76 is diametrically opposed to support portion 68 of fixed bracket 54 and extends from base portion 78 toward base portion 66 of fixed bracket 54, but stops short thereof, terminating in a pair of arms 82 having apertures 84 therein which are in axial alignment with apertures 72 in arms 70. A further pair of apertures 86 are located about midway along the length of support portion 80, in axial alignment with apertures 74 described above.

The assembly is completed with a pair of long rod suspension wires 88 fixed in tension between the aligned apertures 72 and 84, and a pair of short rod suspension wires 90 similarly fixed between aligned apertures 74 and 86. It will be noted that each pair of wires 88 and 90 is equidistant from lever arm 52 and on opposite sides thereof, and that pair 88 is at a 90° angle to pair 90. The long wires 88 (also called tension flexures) hold lever arm 52 in a fixed position lengthwise against the pressure in the chamber. The short wires 90 (or, transverse flexures), through movable bracket 76 and fixed bracket 54, hold lever arm 52 fixed except for limited movement in the plane of FIG. 3 (as shown by the arrow). Further, movement of lever arm 52 is restricted to rotation about an imaginary line passing through the centerlines of all four flexures 88 and 90 and lever arm 52. These flexures can be in several configurations, for instance flat strips instead of wires.

As best seen in FIG. 5, the internal end of lever arm 52 is drilled and tapped at 92 to accommodate the socket head screw 94. The purpose of screw 94 is to retain a pair of facing flat blocks 96 and 98 against the end of lever arm 52, and on their facing surfaces blocks 96 and 98 have mating semicircular grooves which clamp nozzle link 24 therein when screw 94 is tightened.

Figure 6:
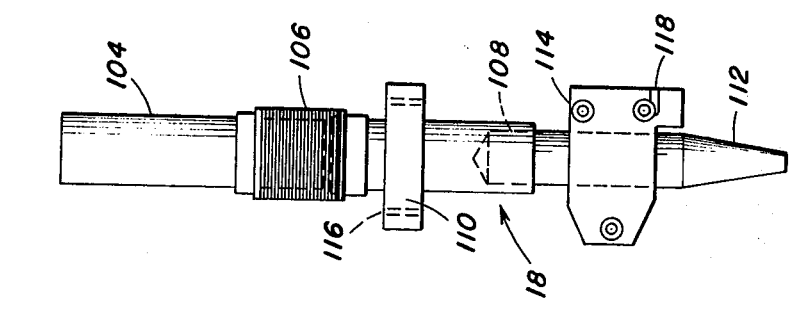
FIG. 6 is a detailed view of the nozzle assembly of the FIG. 1 embodiment.

With reference again to FIG. 1, the nozzle assembly 18 is secured in nozzle plug 32, and its movement is restricted by a cylindrical sleeve 100 and a pair of nozzle suspension wires 102. The nozzle assembly proper is best seen in FIG. 6. The essential elements of nozzle assembly 18 are an upstream tube 104, a bellows 106, a downstream tube 108, a collar 110, a nozzle 112 and a nozzle clamp 114. Upstream tube 104 has one end thereof fitted into fluid supply passage 34, as seen in FIG. 2. A shoulder 116 near the other end of tube 104 provides a support for one end of the bellows 106, but allows the free end of tube 104 to extend almost through bellows 106. A similar shoulder at the end of downstream tube 108 fits into the other end of bellows 106 and tube 108 is supported thereby. Tube 108 also supports annular collar 110 which is affixed thereto, and which has a slightly smaller diameter than sleeve 100 (FIG. 1), thus restricting movement of the entire nozzle assembly 18. Collar 110 also contains two apertures 116 into which the nozzle suspension wires 102 are secured. It will be noted that the plane of wires 102 is perpendicular to the plane of desired nozzle motion, and thus said motion is not impeded by wires 102. The nozzle 112 is fitted into the free end of downstream tube 108, and carries the nozzle link clamp 114. Clamp 114 comprises a pair of flat plates screwed together, and having a pair of transverse semicirular grooves on their facing surfaces for engaging nozzle 112, plus a groove 118 for securing nozzle link 24.

Figure 7:
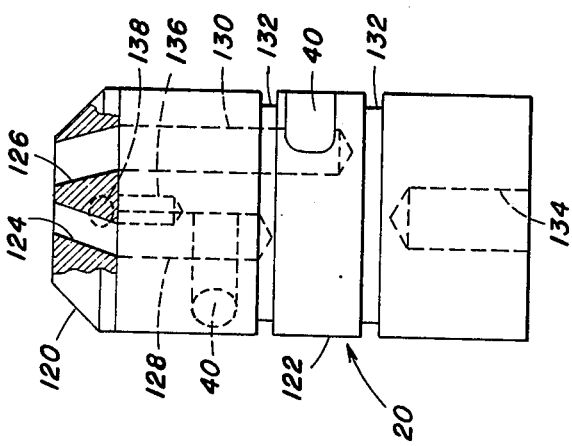
FIG. 7 is a partial cross-sectional elevation of the distributor block assembly of the FIG. 1 embodiment.

The distributor block assembly 20 is shown in detail in FIG. 7 and is comprised of a disc 120 and a plug 122. The disc 120 has its edge downwardly sloped so as to snugly engage the shoulder 26 in the lower portion of chamber 16. Disc 120 contains a pair of fluid passages 124 and 126 adjacent at their orifices on the upper surface but sloped away from each other as they pass through the disc. Disc 120 is on the top of plug 122, and passages 124 and 126 are in fluid communication with passages 128 and 130 therein. The passages 128 and 130 terminate in a pair of orifices 40, which are in fluid communication with fluid outlet passages (not shown) in block 10. Plug 122 also has a pair of circumferential grooves 132 for O-ring or static seals, and a drilled and tapped hole 134 on the bottom for securing distributor block assembly 20 to back plate 30. Alignment of disc 120 and plug 122 is assured by a pair of holes 136 and 138 for a locating pin (not shown).

It is to be noted that the use of a pair of fluid amplifiers in conjunction with the present invention is often desirable. Those skilled in the art will appreciate that such units may be manufactured integrally with the present invention by providing drilled plates having a fluid inlet mating with a fluid outlet from the invention, and formed to accommodate a vortex top plug, vortex bottom plug, vortex outlet and required fluid passages. A complete control system embodying the invention and a pair of vortex amplifiers is illustrated schematically in FIG. 8, such as described in my copending Application Serial No. 82,749 filed October 21, 1970.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A low friction position controller for use within a pressure chamber comprising:

- a lever arm extending from the exterior of said chamber to the interior thereof through an opening in said chamber;
- bellows means disposed inside said chamber for sealing said lever arm to said chamber;
- a fixed bracket member rigidly mounted within said chamber, said fixed bracket member having top, side and bottom portions;
- a movable bracket member having top, side and bottom portions, said top portion of said movable bracket member being rigidly secured to said lever arm;
- tension flexure means mounted inside said chamber for supporting said lever arm and allowing movement thereof in a single plane only about an axis of rotation defined by said tension flexure means, said tension flexure means comprising a first pair of substantially parallel wires secured to and extending between the side portions of said fixed and movable bracket members, said wires of said first pair being disposed substantially perpendicular to, equidistant from and on opposite sides of said lever arm and a second pair of substantially parallel wires secured to and extending between the top portion of said fixed bracket member and the bottom portion of said movable bracket member, said wires of said second pair of wires being disposed substantially parallel to, equidistant from and on opposite sides of said lever arm, and said first pair of wires being disposed in substantially perpendicular relationship to said second pair of wires such that said common axis of said pairs of wires defines the axis of rotation of said lever arm; and
- means linking the end of said lever arm within said chamber with the operative element to be controlled.

* * * * *